(12) United States Patent
Watt et al.

(10) Patent No.: US 7,068,661 B1
(45) Date of Patent: Jun. 27, 2006

(54) METHOD AND APPARATUS FOR PROVIDING CONTROL INFORMATION IN A SYSTEM USING DISTRIBUTED COMMUNICATION ROUTING

(75) Inventors: James Watt, Ottawa (CA); Scott Brim, Ithaca, NY (US); Ravi Gorur, Centreville, VA (US); Ramana V. Gollamudi, Reston, VA (US); Joel M. Halpern, Leesburg, VA (US)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/352,562

(22) Filed: Jul. 13, 1999

(51) Int. Cl.
*H04L 12/28* (2006.01)
*H04L 12/56* (2006.01)

(52) U.S. Cl. .................. 370/395.31; 370/354; 370/428; 709/238

(58) Field of Classification Search ................ 370/252, 370/401, 428, 465, 400, 390, 395.31, 352, 370/353, 354; 709/238
See application file for complete search history.

(56) References Cited

U.S. PATENT DOCUMENTS

| | | | |
|---|---|---|---|
| 5,420,858 A | | 5/1995 | Marshall et al. |
| 5,430,727 A | | 7/1995 | Callon |
| 5,509,123 A | * | 4/1996 | Dobbins et al. ............ 709/243 |
| 5,568,477 A | | 10/1996 | Galand et al. |
| 5,777,984 A | | 7/1998 | Gun et al. |
| 5,818,842 A | | 10/1998 | Burwell et al. |
| 5,905,723 A | | 5/1999 | Varghese et al. |
| 5,918,022 A | * | 6/1999 | Batz |
| 5,951,649 A | | 9/1999 | Dobbins et al. |
| 6,075,788 A | | 6/2000 | Vogel |
| 6,078,963 A | | 6/2000 | Civanlar et al. |
| 6,081,512 A | | 6/2000 | Muller et al. |
| 6,160,811 A | | 12/2000 | Partridge et al. |
| 6,212,185 B1 | * | 4/2001 | Steeves |
| 6,243,382 B1 | | 6/2001 | O'Neill et al. |
| 6,259,699 B1 | | 7/2001 | Opalka et al. |
| 6,307,860 B1 | | 10/2001 | Joffe et al. |
| 6,363,053 B1 | | 3/2002 | Schuster et al. |
| 6,370,142 B1 | * | 4/2002 | Pitcher |
| 6,374,303 B1 | | 4/2002 | Armitage et al. |
| 6,463,067 B1 | | 10/2002 | Hebb et al. |
| 6,487,170 B1 | | 11/2002 | Chen et al. |

FOREIGN PATENT DOCUMENTS

| | | |
|---|---|---|
| GB | 2324676 A | 10/1998 |
| WO | WO 99/27688 | 6/1999 |

OTHER PUBLICATIONS

Murakami et al., RFC 2171, MAPOS–Multiple Access Protocol over SONET/SDH version 1, pp. 1–9, Jun. 1997.

* cited by examiner

*Primary Examiner*—Afsar Qureshi

(57) ABSTRACT

A method and apparatus for providing distributed communication routing includes a route computation engine operably coupled to a plurality of forwarding engines within a logically distributed router. Registration information is provided to the route computation processor by the forwarding engines, and the forwarding engines are recognized and identified by the route computation processor in response. The registration information includes information regarding interfaces or connections amongst the forwarding engines and external routers and other external destinations. The route computation processor provides control information to at least one of the plurality of forwarding engines for distributed routing maintenance and/or specific data forwarding operations. Distributed routing maintenance includes monitoring the status of the forwarding engines, while specific data forwarding operations include tunneling messages relayed to and from the route computation processor by the forwarding engines and packet formatting information that controls how the format of packets forwarded by a forwarding engine.

25 Claims, 6 Drawing Sheets

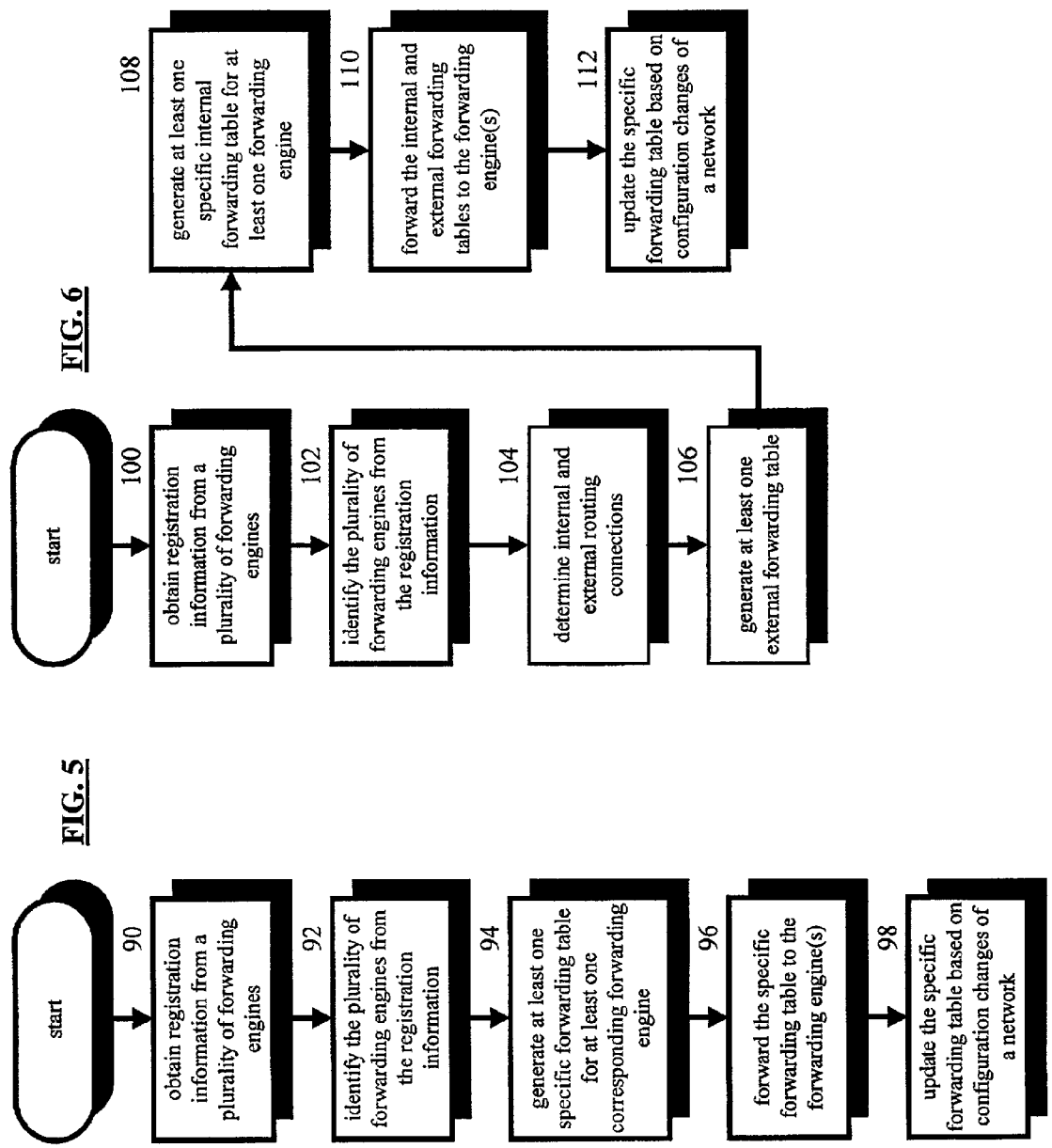

METHOD AND APPARATUS FOR PROVIDING CONTROL INFORMATION IN A SYSTEM USING DISTRIBUTED COMMUNICATION ROUTING

RELATED APPLICATION

This application is related to a co-pending application entitled "METHOD AND APPARATUS FOR PROVIDING DISTRIBUTED COMMUNICATION ROUTING" that has an application number of Ser. No. 09/352,563 and which was filed on Jul. 13, 1999, the same day as the present application.

TECHNICAL FIELD OF THE INVENTION

This invention relates generally to data networks and more particularly to communication within distributed routers within such data networks.

BACKGROUND OF THE INVENTION

Data networks that utilize an IETF communication protocol standard include a plurality of routers that are interoperably coupled to each other and to network segments. Host devices, such as personal computers, video telephones, telephones, facsimile machines, etc., are coupled to the network segments and transfer data to each other via the routers. In order to support such data transportation, the routers communicate with each other using routing protocols to obtain routes between the various network segments and corresponding hosts of the segments. Standard bodies, such as IETF, ATM forum, etc., have standardized various routing protocols.

To further support the data transportation, routers include one or more route computation engines and one or more forwarding engines. The route computation engine executes the routing protocols and generates forwarding tables. (Note that a forwarding table is often referred to as forwarding information base (FIB).) The forwarding engines forward packets from one network segment to another based on forwarding information contained in the forwarding tables. In legacy routers (i.e., routers that have been installed in data networks for some time), the software and hardware of the routing engine and of the forwarding engines are contained within the same physical structure. As such, the interaction and control of data transportations between the routing engine and forwarding engines was trivial.

To provide distributed routing functions, distributed routers have been developed in which the various components of the router (e.g., the route computation engine and forwarding engines) are logically separate entities that may be contained within physically diverse packages. In prior art systems, communication between the components of a distributed router is based on a query response model. In such a model, the forwarding engine sends a query to the route computation engine whenever it needs forwarding information. On receipt of the query, the routing engine, or route computing component, accesses its forwarding tables, or other local databases, and responds with the appropriate information. A query response is exchanged for each element of forwarding information required. In a large network, with multiple accessible networks and hosts, a substantial amount of communication between the forwarding engines and the route computation engine is required just to handle the query response mechanism. In other words, each time a forwarding engine has a data packet to transmit, it must query the routing engine to obtain forwarding information. As the size of the network increases, the amount of control traffic required to process the queries increases correspondingly.

Therefore, a need exists for a method and apparatus that reduces overhead traffic in providing routing information for forwarding packets within a distributed router.

BRIEF DESCRIPTION OF THE DRAWINGS

FIG. 5 illustrates a flow diagram of a method for providing distributed communication routing in accordance with the present invention;

FIG. 6 illustrates a flow diagram of an alternate method for providing distributed communication routing in according with the present invention.

DETAILED DESCRIPTION OF A PREFERRED EMBODIMENT

Generally, the present invention provides a method and apparatus that includes processing for providing distributed communication routing. Such processing begins by obtaining registration information from a plurality of forwarding engines. The processing continues by identifying the plurality of forwarding engines based on the registration information. Having done this, the process proceeds to generate at least one specific forwarding table for at least one corresponding forwarding engine of the plurality of forwarding engines. In one embodiment, a specific forwarding table is generated for each of the plurality of forwarding engines, i.e., each forwarding engine has its own forwarding table. The processing then continues by forwarding the specific forwarding table to the corresponding forwarding engine. In an alternate embodiment, the processing determines internal routing connections and external routing connections for the plurality of forwarding engines after identifying the forwarding engines. The alternate processing continues by generating at least one external forwarding table, which provides forwarding information to routers external to a distributed router, for at least some of the plurality of forwarding engines. In one embodiment, a single external forwarding table is generated for all of the forwarding engines. The processing then continues by generating at least one specific internal forwarding table that provides information to a specific forwarding engine for routing data to other forwarding engines within the distributed router. Having generated the internal and external forwarding tables, the tables are forwarded to the corresponding forwarding engine or engines. With such a method and apparatus, more efficient distributed forwarding information is obtained, thus saving significant computational overhead within a distributed router.

The connections between the route computation engine and the plurality of forwarding engines can also be used for specific data forwarding operations and maintenance of the distributed router. In one embodiment, the route computation engine can pass messages through one or more of the forwarding engines to external routers coupled to the forwarding engines for the purpose of router—router peer protocols. The route computation engine can also send status queries to the forwarding engines and update the status of the distributed router based on the responses. The route computation engine can also provide additional control information to one or more of the forwarding engines regarding formatting or other data presentation or encapsulation requirements of receiving entities to which the forwarding engines are providing data. In addition to these capabilities, varying levels of service may be provided between the route computation engine and the forwarding engines such that control traffic within the distributed router can be segregated in terms of quality of service.

Figure 1:
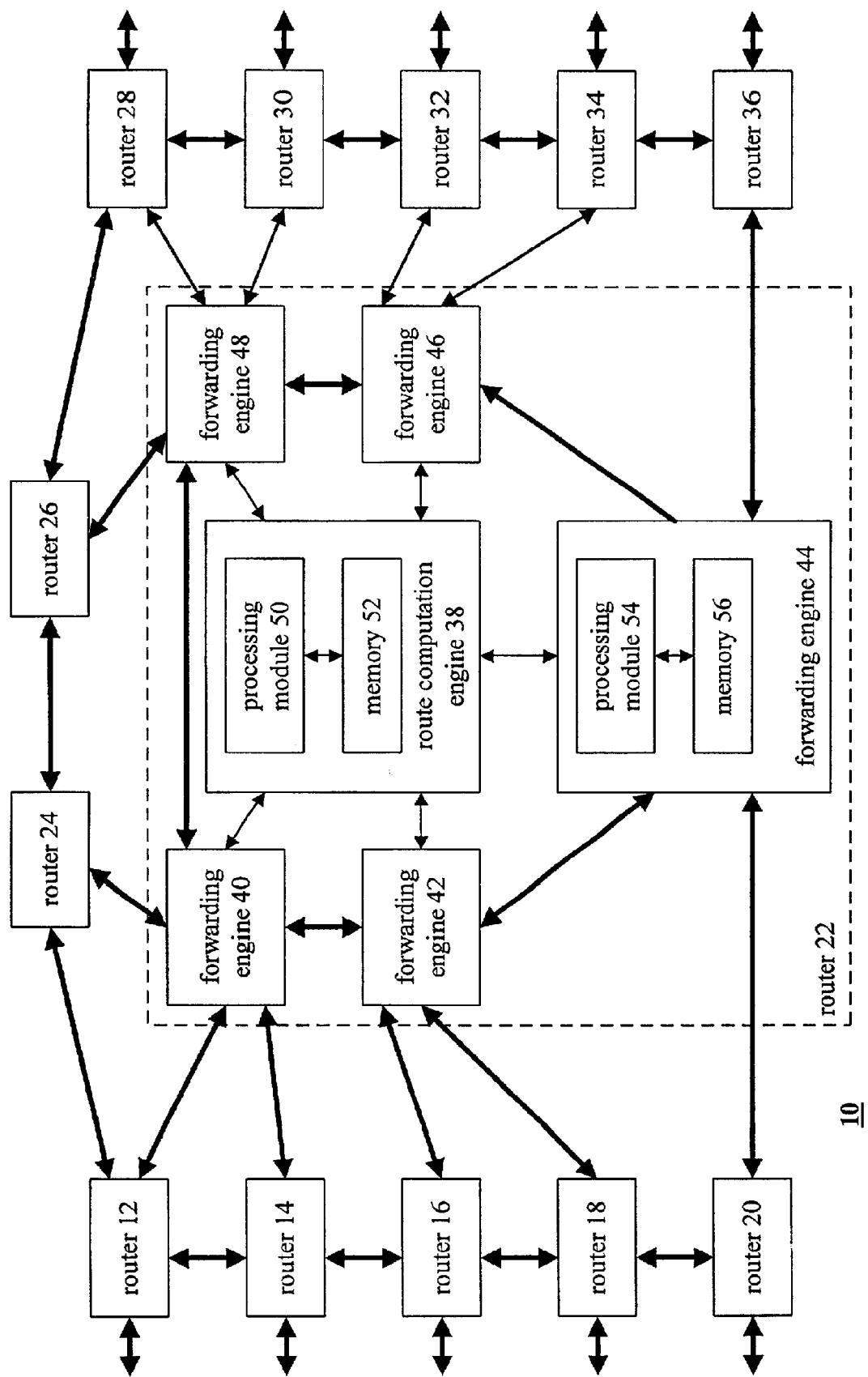
FIG. 1 illustrates a block diagram of a data network in accordance with the present invention.

The present invention can be more fully described with reference to FIGS. 1–7. FIG. 1 illustrates a data network 10 that includes a plurality of routers 12–36 interoperably coupled. Each of the routers may be a legacy router (i.e., containing a routing engine and a plurality of forwarding engines within a single physical device) or a logical distributed router having at least one routing computation engine and a plurality of forwarding engines physically distributed within the logically distributed router.

Router 22 is a logically distributed router that includes a plurality of forwarding engines 40–48 and a route computation engine 38. The route computation engine 38 includes a processing module 50 and memory 52. The processing module 50 may be single processing device or a plurality of processing devices. Such a processing device may be a microprocessor, microcontroller, digital signal processor, microcomputer, state machine, logic circuitry, and/or any device that manipulates signals (e.g. analog or digital) based on operational instructions.

The memory 52 may be a single memory device or a plurality of memory devices. Such a memory device may be a random access memory, read-only memory, floppy disk memory, hard drive memory, system memory of a computer, and/or any device that stores operational instructions and data. Note that if the processing module implements one or more of its functions via a state machine or logic circuitry, the memory storing the corresponding instructions is embedded within the circuitry comprising the state machine or logic circuitry. The operational instructions stored in memory 52 and executed by processing module 50 will be discussed in greater detail with reference to the processing steps of FIGS. 5 and 6 and in conjunction with the graphical representations of FIGS. 2 and 3.

The forwarding engines 40–48 each include a processing module 54 and memory 56. The processing module 54 may be of a similar type as processing module 50 and memory 56 may be of a similar type as memory 52. In general, the route computation engine 38, which is often referred to as a route service instance, generates routing information specific to each forwarding engine contained within the logically distributed router 22. The information is compiled to produce specific forwarding tables that are provided to each of the forwarding engines 40–48. The forwarding engines 40–48 utilize the specific forwarding tables to route data to other routers 12–20 and 24–36.

The interconnections, or traffic flows, between the route computation engine 38 and the forwarding engines 40–48 are preferably point-to-point connections, which may be ATM or Frame Relay switched or permanent virtual circuits, TCP/IP or UDP/IP associations, or MPLS label-switched paths. For scaling purposes, these interconnections may be shared by multiple forwarding engines if the underlying connection technique supports such sharing. When a number of different traffic flows are available between the route computation engine 38 and the plurality of forwarding engines 40–48, different levels, or qualities, of service may be provided over the different traffic flows. Thus, the quality of service across a traffic flow from the route computation engine 38 to one forwarding engine may be greater than the quality of service on the traffic flow to another forwarding engine. Note that a combination scaling and separation may be utilized to provide various forwarding engine groupings with different control traffic qualities of service.

Figure 2:
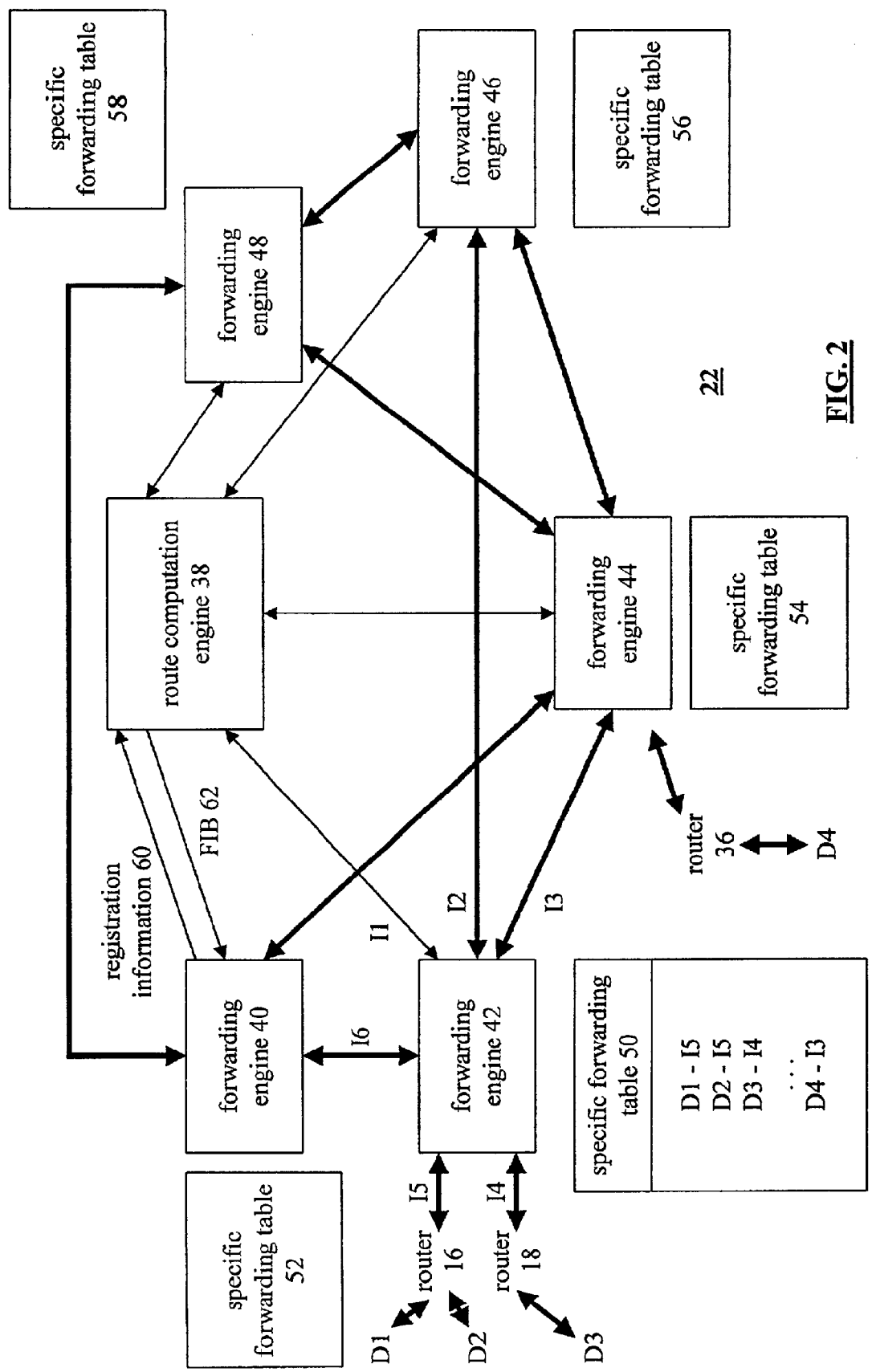
FIG. 2 illustrates a graphical representation of a technique for providing forwarding information within a distributed router in accordance with the present invention.

FIG. 2 illustrates a graphical representation of the logically distributed router 22 generating specific forwarding tables 50–58. The connections between the forwarding engine 42 and its neighboring routers and forwarding engines are sequentially labeled (I1–I6) to aid in illustration of the forwarding table generation. In the logically distributed router 22, forwarding engines 40–48 register with the route computation engine 38 by providing registration information 60. Registration is a handshake mechanism by which the forwarding engines 40–48 and the route computation engine 38 set up an association with each other. The registration information 60 includes the identity of the forwarding engine and other functional information as prescribed by existing data network standards. Preferably, the connections between each of the forwarding engines 40—48 and any external routers are included in the registration information.

Upon receiving the registration information 60, the route computation engine 38 generates a forwarding information base 62 that is provided to the forwarding engines. The forwarding information base 62 informs each forwarding engine of the different paths to all the reachable destinations in terms of the forwarding engine's connections or couplings to external routers and to other forwarding engines. This forwarding table is specific to each forwarding engine. For example, assume destinations D1 and D2 are beyond router 16, destination D3 is beyond router 18, and destination is D4 beyond router 36. The route computation engine 38 determines the location of these destinations via standard routing protocols and builds the forwarding table 50 (for these destinations) as follows:

D1-I5

D2-I5

D3-I4

D4-I3.

Where I5 is the identity given to connection or coupling between forwarding engine 42 and router 16. I4 is the identity given to connection or coupling between forwarding engine 42 and router 18. I3 is the identity given to connection or coupling between forwarding engine 42 and forwarding engine 44 at the forwarding engine 42 side. The same is done for other destinations. The different connections or couplings I5, I4, etc. are commonly known as interfaces of the forwarding engine. The notation D1-I5 is used to indicate to the forwarding engine that all data communication packets to destination D1 should be forwarded via connection or coupling I5.

Once the registration process has been completed, the route computation processor 38 may send status request or "hello" messages to one or more of the forwarding engines 40–48 in order to monitor their functional status. This is part of the maintenance of the distributed routing system. The status requests are sent as control information that may be included in a control message relayed along the connections between the forwarding engines 40–48 and the route computation processor. When capable, each of the forwarding engines 40–48 respond to a status query with a status response that relays information regarding the present functionality of the forwarding engine and various parameters or states associated with the forwarding engine. The status may include current state of the various interfaces with other network entities, current data forwarding parameters, etc.

The route computation processor 38 may then update the current status of the distributed router based on status responses received from the forwarding engines. Note that a lack of response from a forwarding engine may be interpreted to imply that the forwarding engine is experiencing problems, and this change in status should be taken into account along with changes in status reported in the status responses received from other forwarding engines. Changes in forwarding engine status may result in modification to the forwarding tables that have been generated, where the modified forwarding tables are then provided to the forwarding engines for use.

In some embodiments, the route computation processor 38 may wish to use the interface with one or more of the forwarding engines to forward a message to an external router or to some other external entity that is coupled to one of the forwarding engines 40–48. In order to support this, the forwarding engines are preferably configured to recognize "tunneling" messages received from the route computation processor 38. The forwarding engines can then strip off any unneeded encapsulation that corresponds to the protocol used between the forwarding engine and the route computation processor, add any new encapsulation or formatting for the transmission to the external entity, and forward the message on the appropriate interface. Supporting these tunnelng messages may be as simple as forwarding them according to destination information included in the tunneling message without any modification.

Just as tunneling messages may be provided external to the forwarding engines from the route computation engine, similar messages can be relayed to the route computation engine by the forwarding engines. Thus, the tunneling of the messages is preferably supported in both directions. Other specific data forwarding operation may also be supported by the forwarding engines, where the control message that requests forwarding includes at least one data packet and the instructions that determine how the data packet(s) should be forwarded.

In conjunction with general data forwarding or with respect to specific data forwarding operations requested by the route computation engine, the route computation engine may provide additional control information to one or more of the forwarding engines relating to packet configuration. Thus, if one forwarding engine is expecting data to arrive according to a certain protocol, header content, data format, encapsulation, etc., the route computation engine can provide control information to other forwarding engines indicating that data packets forwarded to that forwarding engine should be appropriately formatted. Similarly, the route computation engine may provide traffic classification rules to the forwarding engines through control information or messages relayed across the connection between the forwarding engine and the route computation engine.

Figure 3:
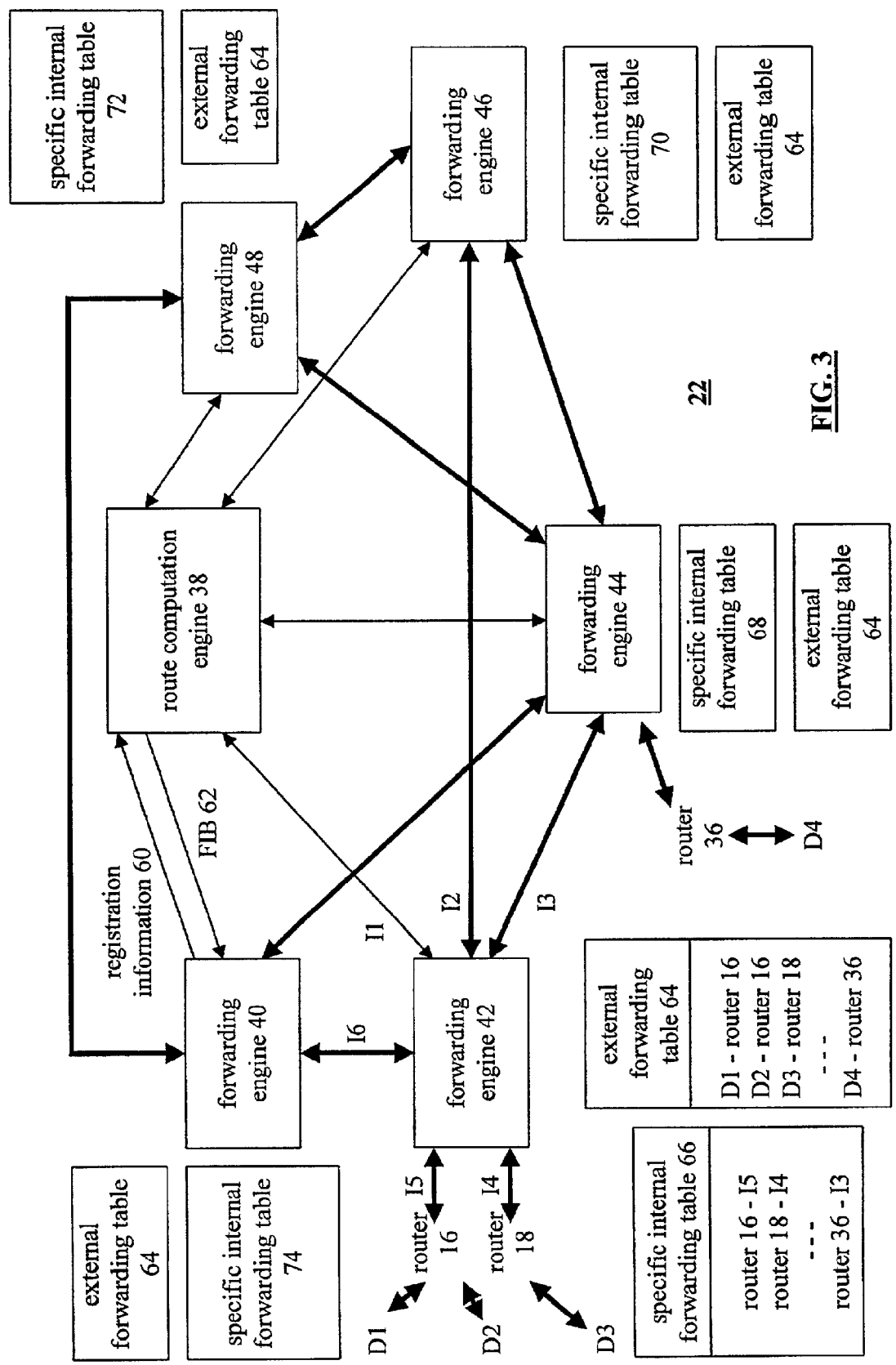
FIG. 3 illustrates a graphical representation of an alternate technique for providing forwarding information within a distributed router in accordance with the present invention.

FIG. 3 illustrates an alternate graphical representation of the logically distributed router 22. In this illustration, the route computation engine 38 computes an external forwarding table 64 and a plurality of specific internal forwarding tables 64–74. The external forwarding table 64 is common to all of the forwarding engines in the logically distributed router. The external forwarding table indicates how data is forwarded to other external routers or other external entities with respect to the logically distributed router 22. As an example, external forwarding table 64 may indicate that destination D1 is reachable via router 16. This external forwarding table will list all destinations reachable via external routers, i.e., D1-router 16
D2-router 16
D3-router 18
D4-router 36
Dn-router 32.

Although the external routers may be directly coupled to a forwarding engine, it is not required, and the general concepts described herein still apply. As stated above, the external forwarding table is common to all the forwarding engines in the logically distributed router.

The route computation engine also generates a specific internal forwarding table for each forwarding engine. The specific internal forwarding table indicates the connection or coupling identities to immediately reachable neighboring routers and other forwarding engines in the distributed router. For example, from forwarding engine 42 router 36 is reachable via connection or coupling I3. I3 is identity of the connection or coupling between forwarding engine 42 and forwarding engine 44. For example, the specific forwarding table 66 generated for forwarding engine 42 may include:

Router 16-I5
Router 18-I4
Router 36-I3.

Thus, in this embodiment, each forwarding engine includes a copy of the external forwarding table 64 that indicates an external router for each reachable destination and a forwarder-specific internal forwarding table that indicates the connections and couplings available to reach each external router and external connection. The forwarding engine can then combine the information in these tables to determine forwarding information required to reach every reachable destination.

Additional routing information to be included in the forwarding tables may be provided by users through some type of user interface. The additional user-specified routing information, describing what are often referred to as "static routes", can include information that is included in the external forwarding table, which is common to all forwarding engines, and also may include information to be included in the internal forwarding table for one or more forwarding engines.

Because the external forwarding table is common to all the forwarding engines, it is computed only once and transferred to each of the forwarding engines. As such, a significant amount of computational resources are saved within the route computation engine 38, as well there may be a reduction in amount of traffic between the route computation engine and the forwarding engines.

As was the case with the logically distributed router of FIG. 2, the route computation engine 38 of FIG. 3 may utilize the interface with the forwarding engines to perform tasks such as forwarding or receiving tunneling messages, determining status of the forwarding engines, configuring forwarding packet formats, etc. In the case where the status of an interface within the logically distributed router changes, it may be that the change is specific to a subset of the plurality of forwarding engines such that only a few of the specific internal forwarding tables need to be updated. In other cases, the change may affect the entire router 22, and the external forwarding table 64 may have to be recompiled and redistributed to each of the forwarding engines.

As an example of the operation of the logically distributed router 22 shown in FIG. 3, assume that a data packet is received from router 16 via forwarding engine 42 with a destination of D4. As shown, D4 is coupled to router 36, which is coupled to forwarding engine 44. Upon receiving the data packet, forwarding engine 42 determines, using the external forwarding table 64, that the destination D4 is reachable via router 36. Having made this determination, the forwarding engine 42 utilizes its specific internal forwarding table 66 to identify the connection 13 as the connection appropriate for forwarding to router 36. Once it receives the data packet, forwarding engine 44 employs the same procedure using the external forwarding table 64 and the specific internal forwarding table 68 to determine the appropriate connection to router 36 for forwarding the data packet.

As another example, assume that a data packet is received by forwarding engine 40 and is to be provided to destination Dn coupled to router 32 connected to forwarding engine 46. In this instance, forwarding engine 40 is not directly coupled via the network fabric, or internal connections, to forwarding engine 46. As such, the forwarding engine 40 utilizing the external forwarding table 64 and its respective internal forwarding table 74 to determine that the route computation engine has prescribed an internal path of forwarding to forwarding engine 44 which in turn will provide the packet to forwarding engine 46. The route computation engine 38 may also prescribe an internal path through forwarding engine 48.

The tables provided to the forwarding engines in all of the embodiments described above may contain multiple routes to the same destination. Each forwarding engine can, use multiple routes to distribute the packets forwarded to a destination over multiple paths. If these paths have different transmission and quality of service characteristics, the forwarding engine can be configured by a control message from the route control engine 38 to use these different routes to provide different packets with different qualities of data forwarding service.

As one of average skill in the art will appreciate, the forwarding engines within the logically distributed router 22 may each receive an individual specific internal forwarding table and a common external-forwarding table. Alternatively, the forwarding engines may be grouped such that for a particular group, the group receives an individual specific forwarding table. This requires the computational engine to perform less specific computations (i.e., performing forwarding computations for a group as opposed to individual forwarding engines). As such, the forwarding engines within a group would utilize a shared forwarding table. As one of average skill in the art will appreciate, the forwarding engines of FIG. 2 may be similarly grouped utilizing a specific forwarding table. In addition, the forwarding engines may be grouped wherein each group utilizes a shared external forwarding table where each group has its own external forwarding table. As can be seen from these example, one of average skill in the art may section the logically distributed router 22 in a variety of ways to take advantage of the teachings of the present invention.

As one of average skill in the art will also appreciate, comparing the specific forwarding table 50 of FIG. 2 with the specific internal forwarding tables 66 and external forwarding table 64 of FIG. 3 reveals that separate internal and external forwarding tables isolates the changes in the external topology from that of the internal topology of the router. Therefore, when the external topology changes, only the common external table needs to be recomputed once and sent to all forwarding engines. This reduces the computational overhead in the route computation engine. Second, if the internal topology changes or a connection between forwarding engines breaks down, then only the specific forwarding tables of the affected forwarding engines are recomputed and sent to the affected forwarders. This also reduces the computation requirements of the routing engine and the amount of data sent to the forwarders when changes occur.

Figure 4:
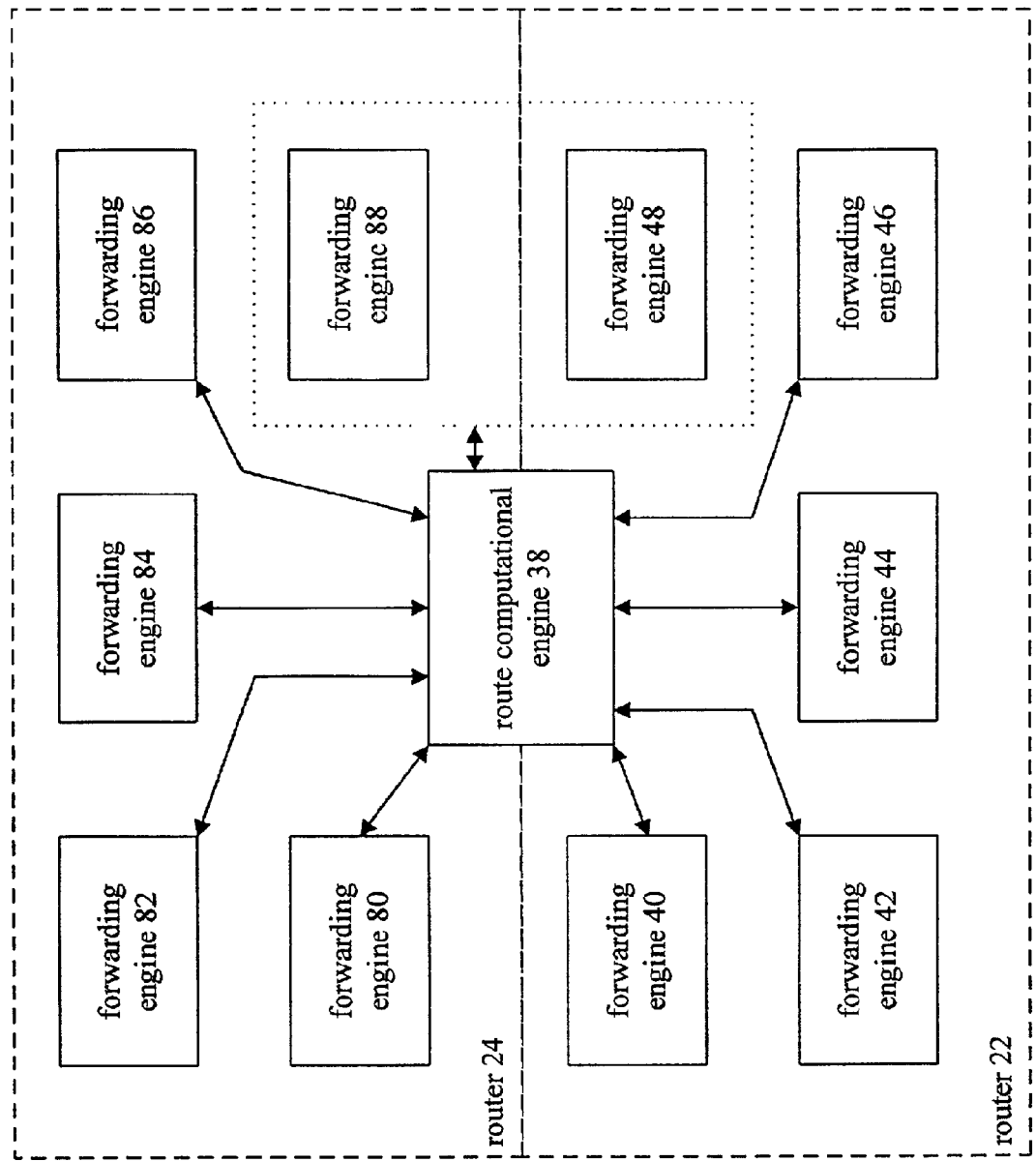
FIG. 4 illustrates a block diagram of multiple distributed routers in accordance with the present invention.

FIG. 4 illustrates a schematic block diagram of routers 22 and 24, which are logically distributed routers utilizing a common route computation engine 38. As shown, logically distributed router 24 includes forwarding engines 80–88. In addition, forwarding engine 88 of router 24 and forwarding engine 48 of router 22 are within a same physical structure. As such, the route computation engine 38 only has a single virtual circuit connection, or interface, to these engines. Accordingly, the route computation engine 38 would need to include a multiplexing function such that it may forward the appropriate specific internal forwarding tables to the appropriate forwarding engine.

Alternatively, a single physical structure may contain multiple route computation engines, which are coupled to different distributed routers that communicate with other physically separate devices containing the forwarding engines of the other routers. Such a scheme makes efficient use of control virtual connections between the distributed components utilizing a multiplexing mechanism to separate control messages belonging to the different logically distributed router components. As such, the route computation engine is defined as a control component for one logically distributed router while the forwarding engines are defined as the forwarding components for the logically distributed router. Accordingly, each route computation engine computes the forwarding tables for its own forwarding components independent of other route computation engines in the same physical structure. An application of this would be to provide partitioned routing services, or virtual private networks (VPNs).

It should be apparent to one of ordinary skill in the art that the functional components of the system may be distributed in arbitrary ways to the physical equipment. In cases where multiple functional components are grouped together in a piece of physical equipment, a multiplexing mechanism is included to reduce the required physical connections between the physical equipment of the system. For example, if one physical equipment box includes ten route computation engines and another physical equipment box includes ten forwarding engines, the two boxes may communicate with each other via a single virtual connection that is multiplexed.

FIG. 5 illustrates a logic diagram of a method for providing distributed communication routing. The process begins at step 90 where registration information from a plurality of forwarding engines is obtained by a route computation engine. The process then proceeds to step 92 where the identity of the plurality of forwarding engines' is derived from the registration information. Note that the identifying of the forwarding engines may further include authenticating, using standardized authenticating protocols, each of the plurality of forwarding engines. As such, only valid forwarding engines will be identified.

The process then proceeds to step 94 where at least one specific forwarding table is generated for at least one corresponding forwarding engine. Accordingly, one forwarding table may be generated for the plurality of forwarding engines, a specific forwarding table may be generated for each individual forwarding engine, or a corresponding forwarding table may be generated for each group of forwarding engines. The process then proceeds to step 96 where the specific forwarding tables are provided to the corresponding forwarding engine or engines. The forwarding may further include verifying receipt of the forwarding tables by the corresponding forwarding engine using standard verification protocols.

The process then proceeds to step 98 where the specific forwarding table is updated based on configuration changes of the network. Such configuration changes may be the addition or deletion of routers coupled to the distributed router, changes of internal coupling between the forwarding engines of a distributed router, failure of internal or external links, and/or any change that would cause a need for updating the forwarding information. These changes may be detected by querying the forwarding engines for status updates that indicate their present functional state, as was described earlier.

FIG. 6 illustrates a logic diagram of an alternate method for providing distributed communication routing. The process begins at step 100 where registration information is obtained for a plurality of forwarding engines. The process then proceeds to step 102 where the plurality of forwarding engines are identified from the registration information. The process then proceeds to step 104 where internal and external routing connections are determined. This was described with reference to FIG. 3. The process then proceeds to step 106 where at least one external forwarding table is generated. Accordingly, the one external forwarding table may be generated for all of the forwarding or a corresponding external forwarding table may be generated for groupings of the forwarding engines.

The process then proceeds to step 108 where at least one specific internal forwarding table is generated for at least one corresponding forwarding engine. Accordingly, the at least one specific internal forwarding table may be a single internal forwarding table for the plurality of forwarding engines, a corresponding internal forwarding table for each of the plurality of forwarding engines, or a corresponding internal forwarding table for each grouping of the plurality of forwarding engines. The process then proceeds to step 110 where the internal and external forwarding tables are forwarded, or provided, to the corresponding forwarding engine or engines. The process then proceeds to step 112 where the specific forwarding table is updated based on configuration changes of the network.

The methods of claims 5 and 6 may both include the route computation engine performing like functions for a second plurality of forwarding engines. As such, a single computational engine may perform like functions for multiple distributed routers. This was described with reference to FIG. 4. These methods may also include the route computation engine performing additional configuration of the various forwarding engines using control messages. In addition, once the forwarding engines have registered and indicated their interface connections, tunneling messages may be sent to and from the route computation engine via the forwarding engines.

Figure 7:
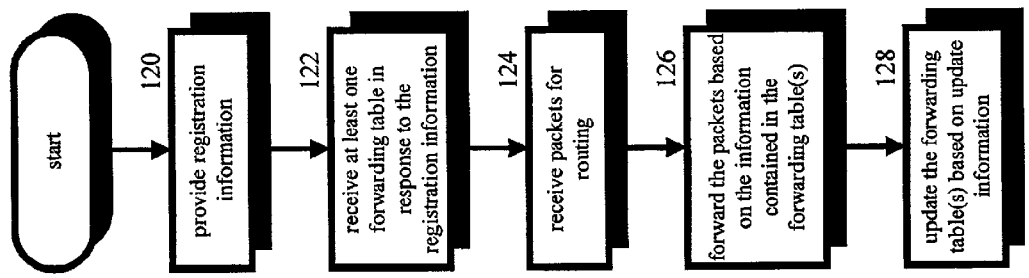
FIG. 7 illustrates a flow diagram of a method for a forwarding engine to facilitate distributed communication routing in accordance with the present invention.

FIG. 7 illustrates a logic diagram of a method for a forwarding engine to facilitate distributed communication routing. The process begins at step 120 where a forwarding engine provides registration information. The process then proceeds to step 122 where at least one forwarding table is received in response to the registration information. The forwarding table may be a specific forwarding table that takes into account both internal and external connections as was shown with reference to FIG. 2. Alternatively, the forwarding table may be two forwarding tables, one for internal connections and one for external connections. This was described with reference to FIG. 3.

The process then proceeds to step 124 where data packets are received for routing. The process then proceeds to step 126 where the packets are forwarded based on the information contained within the forwarding table or tables. The process then proceeds to step 128 where the forwarding table or tables are updated based on update information. The update information is received from the route computation engine as either specific changes or new forwarding tables. The method illustrated in FIG. 7 may also include passing tunneling messages to and from the route computation engine. Additionally, step 126 may include forwarding the packets based on formatting information received from the route computation processor, where the formatting information may indicate a level of service to be provided to a packet or may indicate particular header information, data encapsulation, etc. that is appropriate for packets forwarded on a certain interface or to a certain destination.

The preceding discussion has presented a method and apparatus for providing distributed communication routing. By providing forwarding engines within a logically distributed router a forwarding table or forwarding tables, the query and response model of existing data networks is bypassed, thereby reducing computational overhead. As one of average skill in the art will appreciate, other embodiments may be derived from the teachings of the present invention without deviating from the scope of the claims.

What is claimed is:

1. A method for providing distributing communication routing, the method comprises the steps of:
  a) obtaining at a route computation engine registration information from a plurality of forwarding engines;
  b) identifying the plurality of forwarding engines based on the registration information; and
  c) providing control information to at least one forwarding engine of the plurality of forwarding engines for at least one of: distributed routing maintenance and a specific data forwarding operation.

2. The method of claim 1, wherein providing control information further comprises providing control information for distributed routing maintenance such that the control information includes a control message that requests verification of present functionality of the at least one forwarding engine.

3. The method of claim 2, wherein the present functionality includes information indicating a state of each interface associated with the at least one forwarding engine.

4. The method of claim 2, further comprises:
  d) determining the present functionality of the at least one forwarding engine;
  e) updating registration information of the plurality of forwarding engines based on the present functionality.

5. The method of claim 4, wherein determining the present functionality further comprises determining the present functionality based on at least one of: a response from the at least one forwarding engine, and a lack of response from the at least one forwarding engine.

6. The method of claim 1 further comprises performing a plurality of data forwarding operations based on at least one forwarding table, wherein when a specific data forwarding operation is indicated by the control information, performing the specific forwarding operation based on additional control information provided in the control information.

7. The method of claim 1, wherein providing control information further comprises providing the control information for a specific data forwarding operation, wherein the control information includes a control message that includes at least one data packet and instructions determining how the at least one forwarding engine is to forward the at least one data packet.

8. The method of claim 7, wherein the control message is a tunneling data message, wherein the at least one data packet included in the tunneling data message includes at least one router packet directed to at least one router operably coupled to the at least one forwarding engine, wherein the at least one forwarding engine forwards the at least one router packet to the at least one router, wherein the registration information includes information describing couplings between the plurality of forwarding engines and routers.

9. The method of claim 1, wherein the control information further comprises packet configuration information, wherein the packet configuration information determines packet formats of packets exchanged between forwarding engines.

10. The method of claim 1, wherein providing control information further comprises providing the control information via a plurality of traffic flows that provide data to the plurality of forwarding engines, wherein the plurality of traffic flows allow for varying levels of service with respect to subsets of the plurality of forwarding engines, wherein each subset includes at least one forwarding engine.

11. The method of claim 1, wherein providing control information further comprises providing the control information to a portion of the plurality of forwarding engines via a shared traffic flow.

12. A distributed communications routing circuit comprising:
   a plurality of forwarding engines that are interoperably coupled to permit data exchange; and
   a route computation engine operably coupled to the plurality of forwarding engines, wherein the route computation engine receives registration information from the plurality of forwarding engines, wherein the registration information includes coupling information describing couplings amongst the plurality of forwarding engines and a plurality of external routers, wherein the route computation engine provides control information to at least one forwarding engine of the plurality of forwarding engines for at least one of: distributed routing maintenance and a specific forwarding operation.

13. The circuit of claim 12, wherein the control information includes at least one status request, wherein the at least one forwarding engine provides a status response to the route computation engine in response to the status request, wherein the status response indicates present functionality of the at least one forwarding engine.

14. The circuit of claim 13, wherein the present functionality of the forwarding engine includes state of each interface associated with the forwarding engine.

15. The circuit of claim 14, wherein the route computation engine updates registration information of the forwarding engine based on the status response.

16. The circuit of claim 12, wherein at least a portion of the plurality of forwarding engines are grouped into at least one forwarding engine grouping, wherein the at least one forwarding engine grouping is coupled to the route computation engine via a shared traffic flow.

17. The circuit of claim 12, wherein the plurality of forwarding engines are coupled to the route computation processor via a plurality of connections, wherein the plurality of connections provide a plurality of levels of service for providing control information to the plurality of forwarding engines.

18. A distributed network routing element comprises:
   a processing module; and
   memory operably coupled to the processing module, wherein the memory stores operational instructions that cause the processing module to (a) obtain at a route computation engine registration information from a plurality of forwarding engines; (b) identify the plurality of forwarding engines based on the registration information; and (c) provide control information to at least one forwarding engine of the plurality of forwarding engines for at least one of: distributed routing maintenance and a specific data forwarding operation.

19. The distributed network routing element of claim 18, wherein the memory further comprises operational instructions that cause the processing module to provide control information for distributed routing maintenance such that the control information includes a control message that requests verification of present functionality of the at least one forwarding engine.

20. The distributed network routing element of claim 19, wherein the present functionality includes information indicating a state of each interface associated with the at least one forwarding engine.

21. The distributed network routing element of claim 18, wherein the memory further comprises operational instructions that cause the processing module to: d) determine the present functionality of the at least one forwarding engine; and e) update registration information of the plurality of forwarding engines based on the present functionality.

22. The distributed network routing element of claim 21, wherein the memory further comprises operational instructions that cause the processing module to determine the present functionality based on at least one of: a response from the at least one forwarding engine, and a lack of response from the at least one forwarding engine.

23. The distributed network routing element of claim 18, wherein the memory further comprises operational instructions that cause the processing module to issue a tunneling data message, wherein at least one data packet is included in the tunneling data message, wherein the at least one data packet is directed to at least one router operably coupled to the at least one forwarding engine, wherein the at least one forwarding engine forwards the at least one router packet to the at least one router, wherein the registration information includes information describing couplings between the plurality of forwarding engines and routers.

24. The distributed network routing element of claim 18, wherein the control information further comprises packet configuration information, wherein the packet configuration information determines packet formats of packets exchanged between forwarding engines.

25. The distributed network routing element of claim 18, wherein the memory further comprises operational instructions that cause the processing module to provide the control information via a plurality of traffic flows that provide data to the plurality of forwarding engines, wherein the plurality of traffic flows allow for varying levels of service with respect to subsets of the plurality of forwarding engines, wherein each subset includes at least one forwarding engine.

* * * * *